Figure 3:
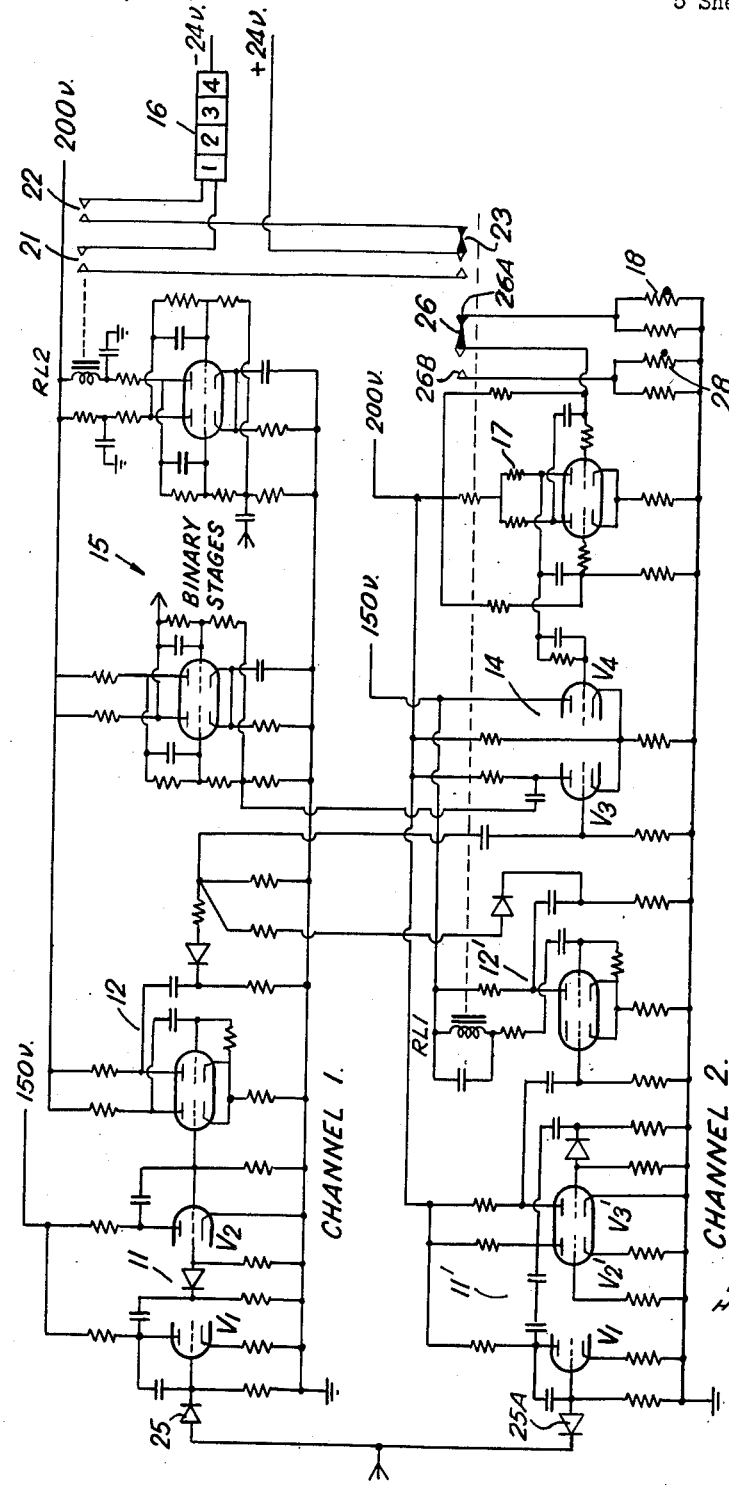

April 17, 1962   H. FELLOWS   3,029,637
FLOWMETERS
Filed June 17, 1959
5 Sheets-Sheet 1
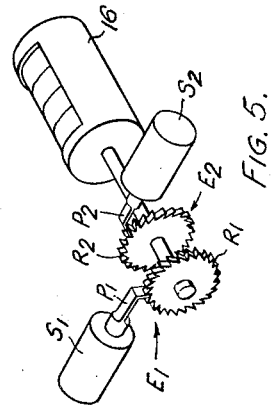
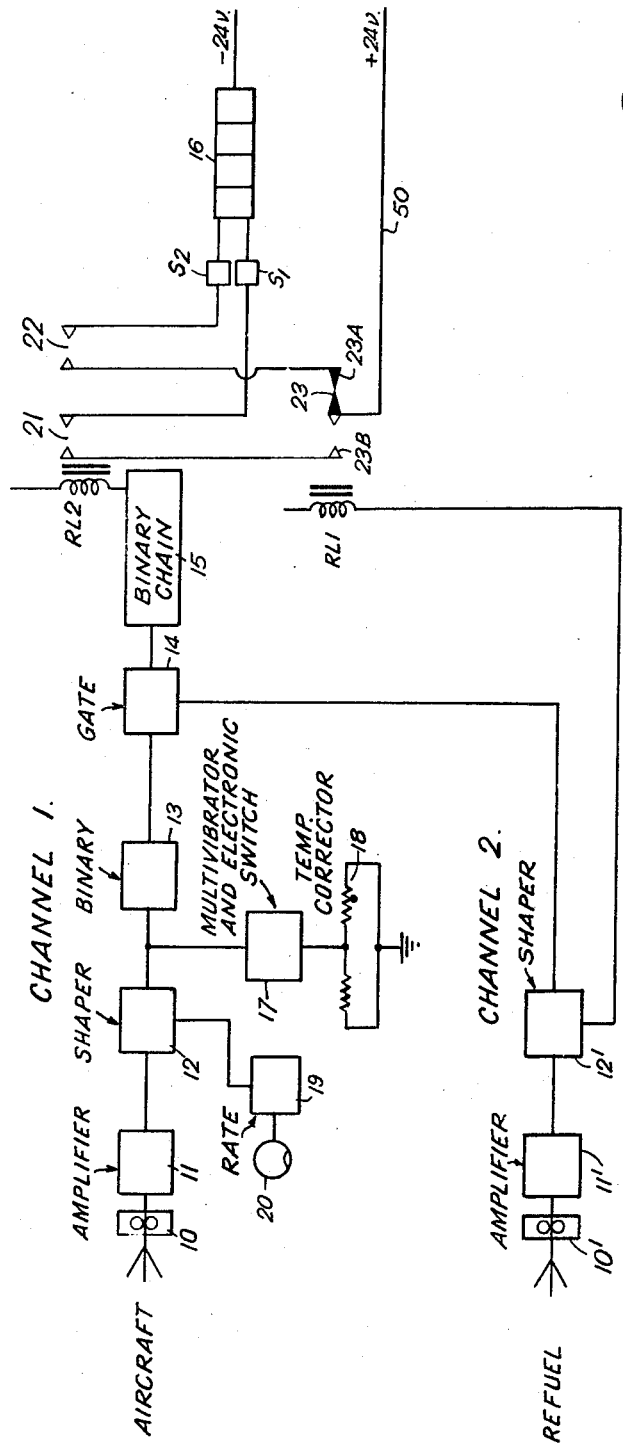
INVENTOR
HORACE FELLOWS

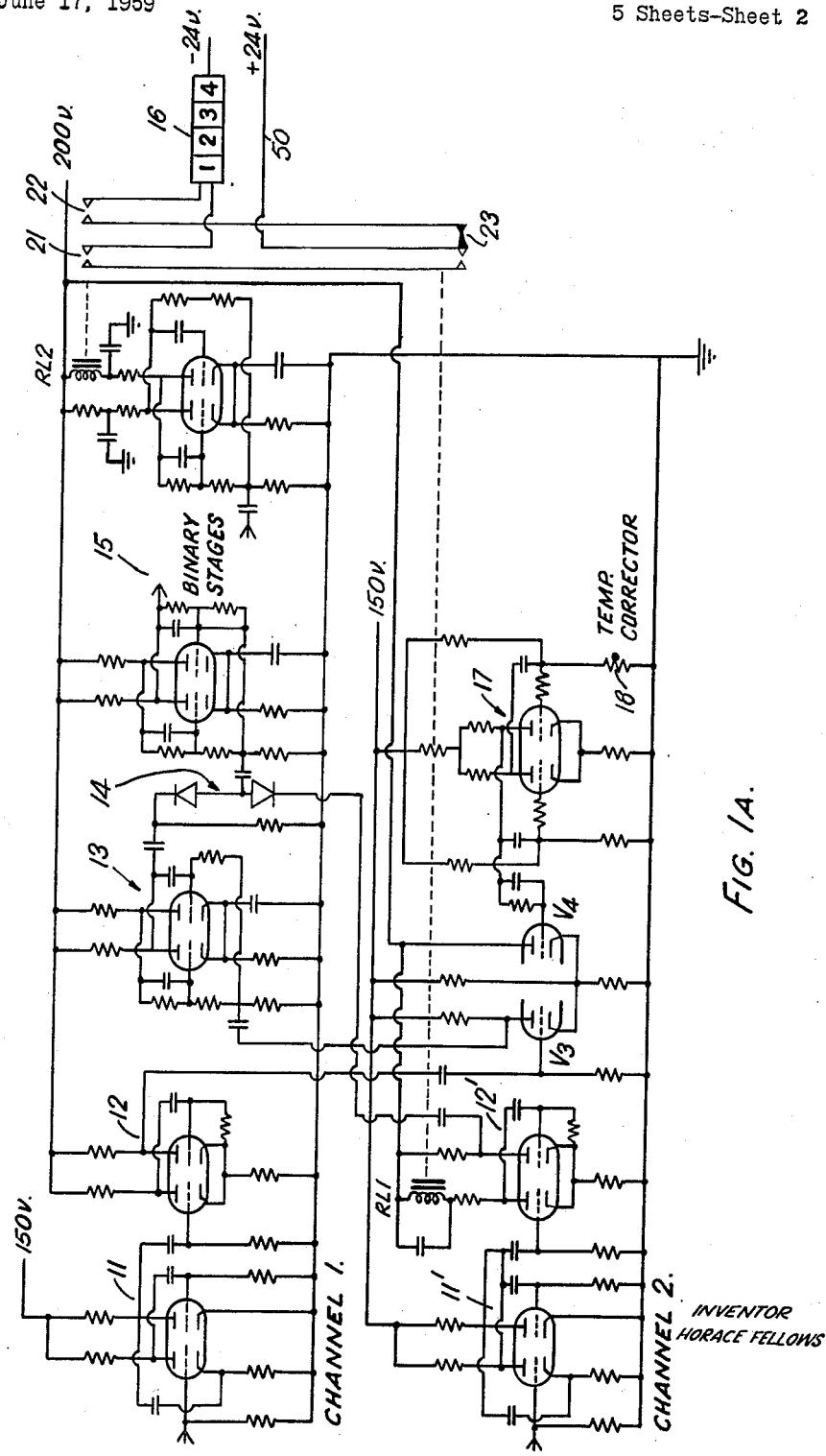
FIG. IA.
INVENTOR
HORACE FELLOWS

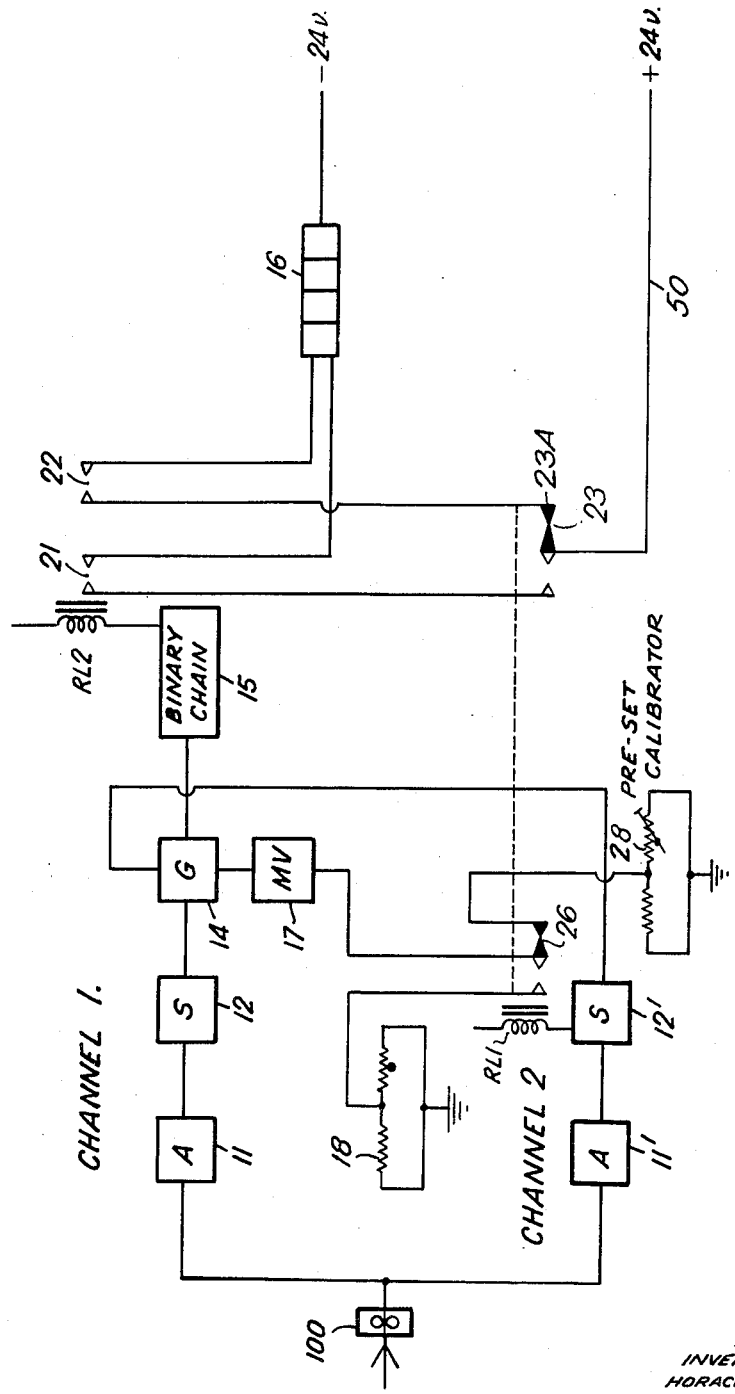

INVENTOR
HORACE FELLOWS

United States Patent Office 3,029,637
Patented Apr. 17, 1962

3,029,637
FLOWMETERS
Horace Fellows, Tettenhall, Wolverhampton, England, assignor to H. M. Hobson Limited, London, England, a British company
Filed June 17, 1959, Ser. No. 821,046
6 Claims. (Cl. 73—194)

This invention relates to electronic flowmeters of the type, described for example in British specification No. 752,496, comprising transmitter for generating electric pulses at a rate representative of the rate of flow of liquid through a flow line, at least one electronic frequency divider coupled to the output of the transmitter and an elecromechanical counter for counting the pulses generated by the last frequency divider.

When such a flowmeter is to be utilized in aircraft, the counter normally operates subtractively as fuel flows from the aircraft tanks so that the pilot is given an indication of the amount of fuel remaining in the tanks. The object of the present invention is to provide an arrangement whereby the counter may also indicate the quantity of fuel which has flowed into the tanks when the aircraft is refueled.

The invention accordingly provides an electronic flowmeter for aircraft of the above type in which the counter is capable of operating both additively and subtractively and comprising switching mechanism which is responsive automatically to change in the direction of flow of fuel in the aircraft fuel system to cause the counter to add when the fuel is flowing in one direction and to subtract when the fuel is flowing in the reverse direction.

Thus, when the counter is required to indicate the quantity of liquid remaining in a tank or tanks, it is caused to operate subtractively on withdrawal of liquid from the tanks and additively when the tanks are refilled. If, however, it is desired that the counter should show the amount of liquid consumed, it will be operated additively in response to withdrawal of liquid from the tanks and subtractively when the tanks are refilled.

In one embodiment of the invention two separate transmitters are provided, one actuated by flow of fuel in the tank-to-engine flow line and the other by flow of fuel in a refuelling flow line and one of the transmitters causes the switching mechanism to occupy one or other of its alternative positions in accordance with whether said transmitter is operative or not.

In another embodiment, a single transmitter is used and produces uni-directional pulses, the polarity of which depends upon the direction of flow of the fuel in a tank-to-engine flow line, and the electronic circuits include means sensitive to the polarity of the pulses for determining the position of the switching mechanism.

The flow meter according to the invention thus includes transmitting mechanism responsive to the flow of fuel in a conduit means through which fuel may flow into and out of a tank and effective to generate pulses at a rate representative of the flow of fuel through said conduit means, said transmitting mechanism consisting of separate transmitters which are selectively effective to generate pulses according to the direction of flow of fuel in said conduit means or of a single transmitter which generates pulses irrespective of the direction of flow of fuel in the conduit means, said pulses being of a polarity dependent upon the direction of said flow. Said transmitting mechanism thus has a directional response to flow of fuel into and out of said fuel tank and operates in alternative modes in accordance with the direction of flow of said fuel. It is connected to two pulse transmitting channels to activate them selectively in dependence upon its mode of operation, the transmitters being individually connected to the channels when the transmitting mechanism includes two selectively operating transmitters, while in a case of a single transmitter the transmitter is connected to the channels through rectifiers so as to activate them selectively in accordance with the polarity of the generated pulses.

Figure 4:
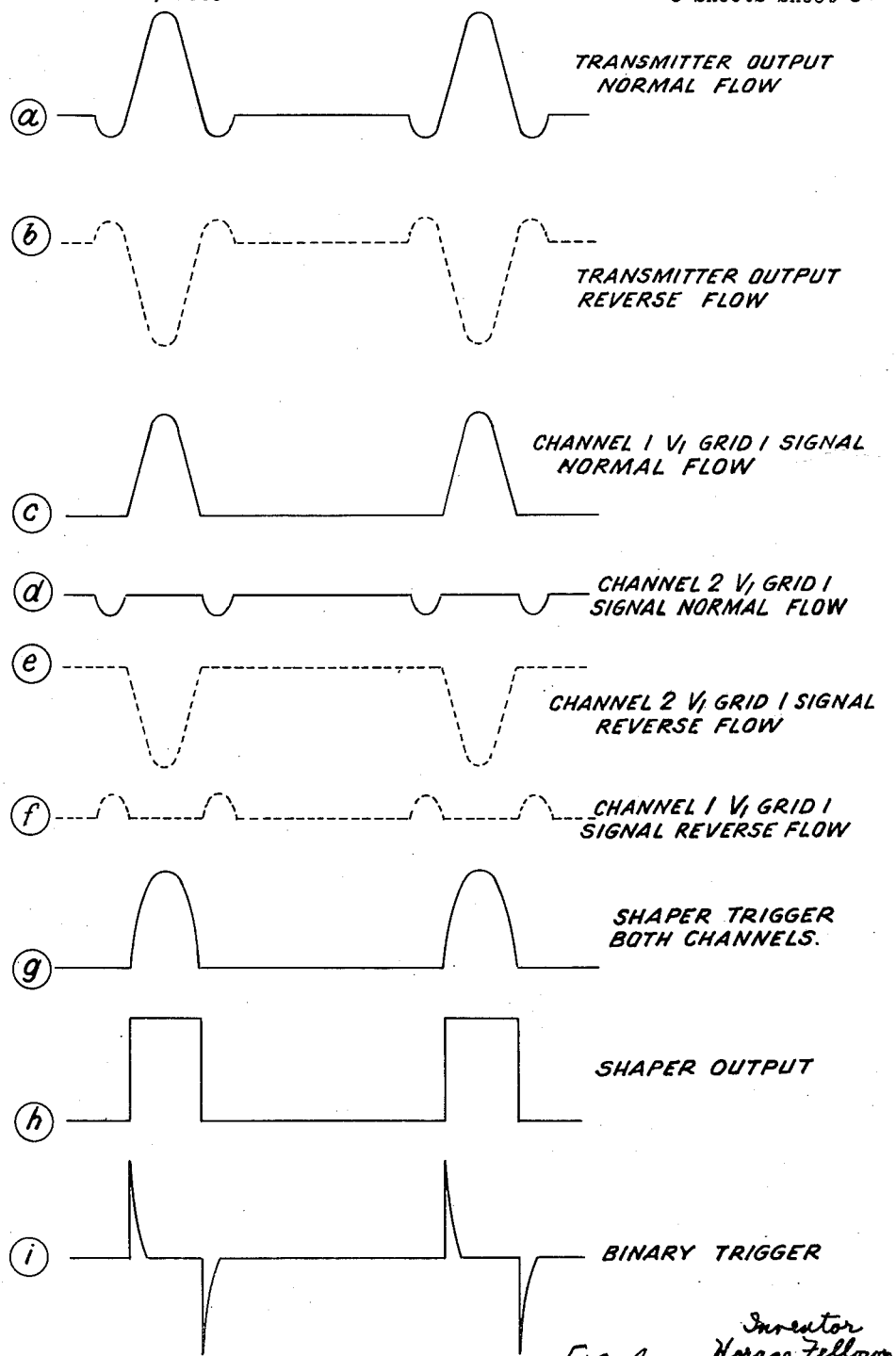

Two alternative forms of fuel flowmeter for aircraft in accordance with the invention will now be described in detail, by way of example, with reference to the accompanying drawings, in which:

FIG. 1 is a block diagram of the first embodiment,
FIG. 1A is a corresponding circuit diagram,
FIG. 2 is a block diagram of the second embodiment,
FIG. 3 is a corresponding circuit diagram,
FIG. 4 shows the wave forms appearing at certain places in the circuit of FIG. 3, and
FIG. 5 is a perspective view showing the solenoid and escapement mechanisms of the counter.

Like reference numerals indicate like parts in all the figures.

The system shown in FIG. 1 comprises two transmitters 10, 10' which are respectively actuated by fuel flowing from the tanks and by fuel flowing to the tanks. The transmitter 10 is situated in the tank-to-engine flow line and the transmitter 10' is situated in the refuelling flow line. Each of these transmitters is of the type shown in FIG. 3 of British specification No. 752,496 and comprises a vaned rotor rotated by the passage of fuel and carrying a magnet which generates in a coil external to the fuel pipe pulses which are unaffected as regards polarity by the direction of flow of the fuel. The pulses from the transmitter 10 are passed, via an amplifier 11, a shaper 12, a first binary frequency divider 13, an electronic gate 14 and a chain of binary frequency dividers 15 to a relay RL2 operating an electromechanical counter 16. Relay RL2 has contacts 21, 22 both of which open when the relay is deenergized and both of which close when the relay is energized. A multi-vibrator 17 and associated components, including a temperature corrector 18 serve, as described in more detail later, to correct for variations in density of the fuel so that the counter 16 indicates mass flow. A rate-meter 19 and associated indicator 20 are connected to the output of the shaper 12.

The counter 16 has two solenoid and escapement mechanisms, one $S_1$, $E_1$ for adding and one $S_2$, $E_2$ for subtracting, which are selectively energized by closure of the contacts 21, 22 associated with the relay RL2 according to the position of a contact 23 associated with another relay RL1. Contact 23 makes with 23A when relay RL1 is de-energized and with contact 23B when relay RL1 is energized. Normally relay RL1, is de-energized and the contact 23 occupies the position shown and contacts 22 accordingly are effective on operation of the relay RL2 to cause the counter 16 to operate subtractively in response to the pulses generated by the transmitter 10. Each pulse from the binary chain 15 then energizes relay RL2 momentarily to cause contacts 22 to connect solenoid $S_2$ to line 50, thereby causing pawl $P_2$ (FIG. 5) to actuate ratchet $R_2$ and rotate the counter subtractively.

While a single transmitter 10 is shown, a separate transmitter may be used in the line leading from each tank to the engine, the pulses from all of these transmitters being fed to the first channel 11—15.

On refuelling, the transmitter 10 is inoperative and the transmitter 10' transmits pulses to a second channel, constituted by an amplifier 11' and a shaper 12', the output of which is fed to the gate 14 and thence to the binary dividing chain 15 and relay RL2.

Since the refuelling transmitter 10' produces less pulses than the engine transmitter 10 per unit quantity of fuel, less binary division is required and signals are therefore appropriately tapped into the binary chain between the first divider 13 and the succeeding dividers 15. The counter contacts 21, 22 are operated as before by the relay RL2. When, however, pulses are transmitted to the second channel the anode of the first valve of the shaper 12' conducts, so energizing the relay RL1. An integrating network associated with the relay RL1 maintains the relay energized even at the lowest rate of flow of fuel to the tanks. As the result, the contact 23 changes from contact 23A to contact 23B and the contacts 21 are effective on operation of the relay RL2 to cause the counter 16 to operate additively. Each pulse from the binary chain 15 then causes solenoid $S_1$ to be connected to line 50, thereby causing pawl $P_1$ to actuate ratchet $R_1$ and rotate the counter 16 additively.

The circuits of the pre-amplifiers 11, 11'; the shapers 12, 12'; and the binary dividers 13, 15 are shown in detail in FIG. 1A. This figure does not show the rate-meter 19 and associated indicator 20 but it shows how correction for changes in density of the fuel is provided in channel 1 so that the counter 16 will indicate mass flow when fuel is being withdrawn from the tanks. As there shown the pulses from the shaper 12 are passed to the first binary divider 13 via the valve $V_3$ of an electronic switch $V_3$, $V_4$, which suppresses certain of the pulses to provide the mass flow indication as more fully described in British specification No. 788,988. The multi vibrator 17 applies signals of variable mark-space ratio to be grid of the cathode follower $V_4$, the mark-space ratio of the signals being varied in accordance with changes in the density of the fuel by adjustment of the resistor 18. The proportion of pulses passed by the gate 14 from the shaper 12 to the binary divider 13 is thus adjusted in accordance with changes in the density of the fuel to cause the counter 16 to indicate mass flow. The divider 13 and the shaper 12' are connected to the following binary divider 15 via a diode gate 14.

In the system shown in FIG. 1, temperature correction is applied to the tank-to-engine flow line only. If desired a similar device can be incorporated in the refuelling line also.

The system shown in FIGS. 2-4 differs from that so far described in that a single transmitter 100 is used which is actuated both by fuel flowing from the tanks and by fuel flowing to the tanks. As in the case of the transmitter shown in FIG. 4 of British specification No. 752,496, the transmitter 100 generates in the external coil unidirectional pulses, the polarity of which depends on the direction of flow. The N—S axis of the magnet extends transversely to the radius of the pipe and I find that pulses of optimum wave form and as shown at (a) and (b) in FIG. 4 are produced when the length of the N—S axis of the magnet is equal to the mean diameter of the coil.

In the system of FIGS. 2-4 the pulses generated by the transmitter 100 pass, according to their polarity, either through channel 1, constituted by a pre-amplifier 11, and a shaper 12, or through channel 2, constituted by a pre-amplifier 11' and a shaper 12', to the gate 14. Thereafter the pulses, after division by the binary counter 15, operate the counter 16 through the agency of the relay RL2 as in the system of FIG. 1.

When fuel is flowing from the tanks, positive pulses (FIG. 4a) are produced by the transmitter 100, and are fed by a rectifier 25 (FIG. 3) to the pre-amplifier 11 in channel 1, the grid of the valve $V_1$ receiving signals of the wave form shown in FIG. 4c. After amplication, shaping by the shaper 12 and division by the binary chain 15 these pulses actuate the relay RL2 as before. The pulses are prevented by a rectifier 25A from activating the channel 2 so that the relay RL1 is de-energized and the contacts 22 are actuated by the relay RL2 to cause the counter 16 to be operated subtractively.

When, however, fuel flows in the reverse direction, the transmitter 100 develops negative pulses (FIG. 4b) which are received by the second channel in place of the first channel and actuate the relay RL2 after passage through the pre-amplifier 11', the shaper 12', the gate 14 and the binary chain 15. Now, however, the relay RL1 is energized and the contacts 21 are accordingly actuated by the relay RL2 and the counter 16 is operated additively.

It will be observed from FIG. 3 that the pulses from both shapers 12, 12' are passed via the gate 14 to the binary dividers 15, the binary divider 13 of FIG. 1A being omitted. Transmitters do not attain the same accuracy in both directions, there being a positive displacement of the flow/impulses response curve, and so it is necessary to apply correction in the reversed flow or refuelling condition. This is achieved by a second contact 26 which, when the relay RL1 is energized, moves from contact 26A to contact 26B to connect the multi-vibrator 17 to a compensating circuit 28 instead of to the temperature correcting circuit 18.

When the contact 26 moves to its alternative position (contact 26B), therefore, the multi-vibrator 17 and electronic gate 14 provide adjustment to compensate for the different characteristic of the transmitter under reverse flow instead of for variations in density of the fuel.

FIG. 4 shows the wave forms of the pulses applied at various points to certain components of the two channels in the circuit of FIG. 3. It will be noted that the amplifier 11 of channel 1 has two valves $V_1$, $V_2$ while the amplifier 11' of channel 2 has three valves $V_1'$, $V_2'$, $V_3'$ so that trigger pulses, FIG. 4(g), of the same polarity are applied to the shapers 12, 12' of both channels.

What I claim as my invention and desire to secure by Letters Patent is:

1. A flowmeter for use in an aircraft fuel system including a fuel tank and a conduit means through which fuel may flow into and out of said fuel tank, said flowmeter comprising transmitting mechanism for generating pulses at a rate representative of the flow of fuel through said conduit means, said transmitting mechanism providing uni-directional pulses having one polarity when fuel is flowing in said conduit means to said fuel tank and a reverse polarity when fuel is flowing in said conduit means out of said fuel tank, a chain of electronic frequency dividers connected to said transmitting mechanism to receive the pulses therefrom, an electromechanical counter coupled to the last of said frequency dividers and adapted to count pulses therefrom, said counter including control means for conditioning said counter to count said pulses additively or subtractively according to the setting of said control means, switching mechanism controlling the setting of said control means and means responsive to the polarity of said pulses for adjusting said switching mechanism to cause the counter to operate additively when fuel is flowing to the tank and subtractively when fuel is flowing from the tank.

2. A flowmeter for use in an aircraft fuel system including a fuel tank and a conduit means through which fuel may flow into and out of said tank, said flowmeter comprising transmitting mechanism for generating pulses at a rate representative of the flow of fuel through said conduit means, said transmitting mechanism providing uni-directional pulses having one polarity when fuel is flowing in said conduit means to said fuel tank and a reverse polarity when fuel is flowing in said conduit means out of said fuel tank, a chain of electronic frequency dividers, two pulse transmitting channels arranged to be selectively activated according to the polarity of said pulses to transmit pulses from the transmitting mechanism to said frequency dividers, an electromechanical counter coupled to the last of said frequency dividers and adapted to count pulses therefrom, said counter including control means for conditioning said counter to count said pulses additively or subtractively according to the setting of said control means, switching mechanism controlling the setting of said control means and means responsive to passage of pulses through one of said transmitting channels for adjusting said switching mechanism to cause the counter to operate additively when fuel is flowing to the tank and subtractively when fuel is flowing from the tank.

3. A flowmeter as claimed in claim 2, wherein said control means includes a pair of solenoid and escapement mechanisms, one arranged to operate the counter additively and the other arranged to operate the counter subtractively, and a first relay connected to be energized by each pulse from the last frequency divider to effect potential energization of said solenoids, and said switching mechanism comprises a second relay controlled by said responsive means and a contact controlled by said second relay, said contact selectively energizing said solenoids in response to energization of said first relay under the control of said second relay.

4. A flowmeter as claimed in claim 3, which includes an electronic gate between said pulse transmitting channels and said frequency dividers, a temperature correcting circuit, a compensating circuit, and a switch controlled by said second relay for connecting said temperature correcting circuit to the gate, when fuel is flowing out of the fuel tank, to provide compensation for changes in density of the fuel and for connecting said compensating circuit to the gate, when fuel is flowing to the fuel tank, to provide for change in the characteristic of said transmitting mechanism.

5. A flowmeter for use in an aircraft fuel system including a fuel tank and a conduit means through which fuel may flow into and out of said fuel tank, said flowmeter comprising transmitting mechanism for generating pulses at a rate representative of the flow of fuel through said conduit means, said transmitting mechanism having a directional response to flow of fuel into and out of said fuel tank and operating in alternative modes in accordance with the direction of flow of said fuel, a chain of electronic frequency dividers, two pulse transmitting channels for transmitting pulses from the transmitting mechanism to said frequency dividers, said transmitting mechanism being connected to said channels to activate them selectively in dependence upon the mode of operation of said transmitting mechanism, an electromechanical counter coupled to the last of said frequency dividers and adapted to count pulses therefrom, said counter including control means for conditioning said counter to count said pulses additively or subtractively according to the setting of said control means, switching mechanism controlling the setting of said control means and means responsive to the passage of pulses through one only of said channels for adjusting said switching mechanism to cause the counter to operate additively when fuel is flowing in one direction in said conduit means and subtractively when fuel is flowing in the other direction in said conduit means, said control means including a pair of solenoids and escapement mechanisms, one arranged to operate the counter additively and the other arranged to operate the counter subtractively, and a first relay connected to be energized by each pulse from the last frequency divider to effect potential energization of said solenoids, and said switching mechanism comprising a second relay controlled by said responsive means and a contact controlled by said second relay, said contact selectively energizing said solenoids in response to energization of said first relay under the control of said second relay.

6. A flowmeter as claimed in claim 5, wherein each of said channels includes a pulse shaper, one of said pulse shapers constituting said responsive means and being connected to said second relay to energize said second relay when pulses are transmitted through said one pulse shaper.

References Cited in the file of this patent

UNITED STATES PATENTS 2,859,616     Fellows _____ Nov. 11, 1958

FOREIGN PATENTS 464,072     Great Britain _____ Apr. 12, 1937